J. F. THOMPSON.
KITCHEN UTENSIL.
APPLICATION FILED MAY 24, 1915.

1,214,388.

Patented Jan. 30, 1917.

Inventor
J. F. Thompson,
By Victor J. Evans
Attorney

Witnesses
M. E. Laughlin.

UNITED STATES PATENT OFFICE.

JOSEPH F. THOMPSON, OF BROOKLYN, NEW YORK.

KITCHEN UTENSIL.

1,214,388.  Specification of Letters Patent.  Patented Jan. 30, 1917.

Application filed May 24, 1915.  Serial No. 30,126.

*To all whom it may concern:*

Be it known that I, JOSEPH F. THOMPSON, a citizen of the United States, residing at Brooklyn, in the county of Kings and State of New York, have invented new and useful Improvements in Kitchen Utensils, of which the following is a specification.

This invention relates to kitchen utensils and it consists in the novel features hereinafter described and claimed.

An object of the invention is to provide a utensil of simple and durable structure which may be used in a number of capacities about a kitchen with convenience. For instance, the utensil may be used for handling cabbage, sprouts, slaw, kraut and also for removing eggs, potatoes and similar articles from hot water and for placing and removing potatoes, apples, etc., upon or over the fire for baking or other purposes.

With these and other objects in view the utensil includes a wire structure having a body portion and a handle connected therewith, and a hinged part pivotally connected with the said body portion with a brace member connected with the said hinged part and also slidably connected with the handle.

Figure 1:
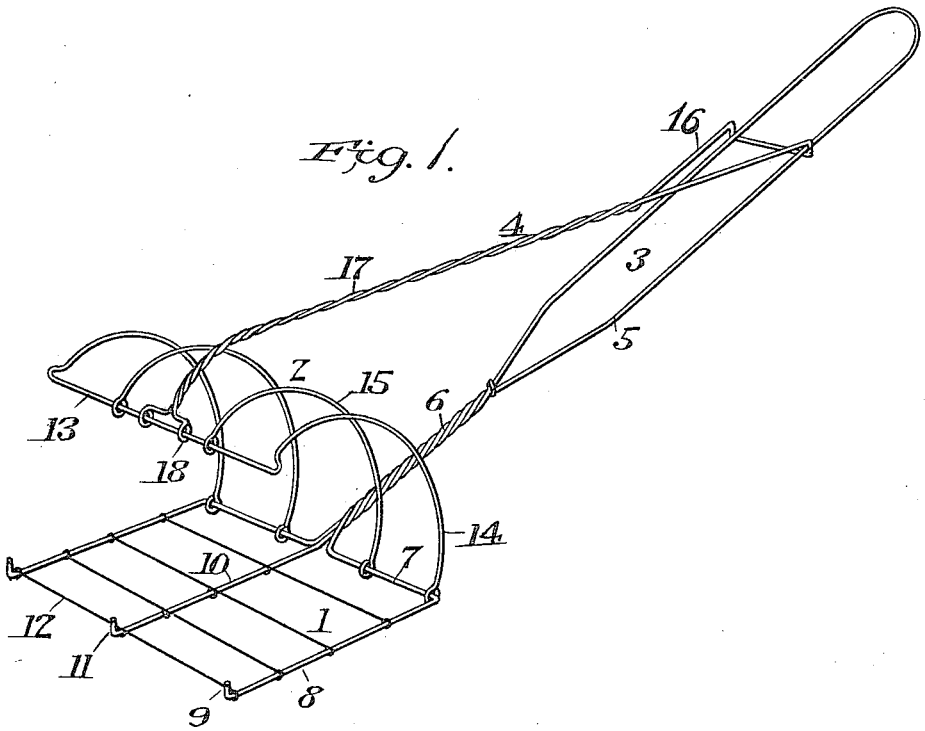
Figure 2:
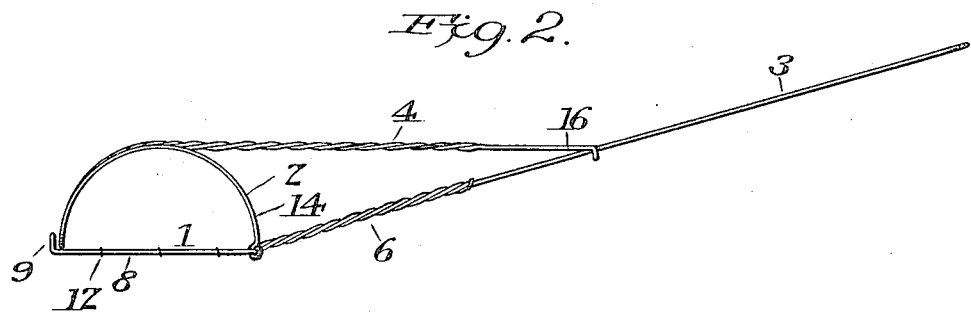

In the accompanying drawing: Figure 1 is a perspective view of the utensil. Fig. 2 is an edge elevation of the same.

The utensil is composed of wire and includes a body portion 1 to which is hingedly connected a top member 2. A handle 3 is connected with the body portion and a brace member 4 is pivotally connected with the free edge portion of the top member 2 and is slidably connected with the handle 3.

The handle 3 consists of a wire 5 which at a point midway between its ends is folded in parallel relation with the opposite sides spaced from each other. The opposite sides of the said wire are then brought together and twisted as at 6. From the twist 6 the end portions of the wire are continued into the body portion 1 and constitute the rear side 7 thereof, the ends 8 and the said ends terminate in up-standing extremities 9. A wire 10 is twisted into engagement with the wire 5 at the twist 6 thereof and extends transversely across the space between the ends 8 of the body portion 1 and is provided at its end with up-standing extremities 11. Cross wires 12 constitute parts of the body portion 1 and are twisted about the intermediate portions of the ends 8 and the wire 10 and are disposed in approximate parallel spaced relation.

The hinged member 2 includes a wire 13 the intermediate portion of which is adapted to engage the body member 1 just within the up-standing extremities 9 and 11 when the said hinged member is closed over the said body member. The wire 13 is formed with curved end portions 14 which are hingedly connected with the rear side 7 of the body member 1. The hinged member 2 also includes wire rods 15 which are bowed and hingedly connected at one end with the rear side 7 of the body portion 1. The ends 14 and the rods 15 are approximately parallel with each other and the rods 15 are spaced from each other and spaced from the ends 14.

The brace 4 is formed from a single wire and the said wire is formed with a loop 16 which slidably engages the spaced parallel portions of the handle 3. From the loop 16 the wire which constitutes the brace 4 is brought together and twisted as at 17 and from the said twist the end portions of the wire which constitutes the brace 4 are disposed in opposite directions and are provided with eyes 18 which loosely receive the intermediate portion of the wire 13, the said eyes being located between the rods 15. The twisted portion 17 of the brace 4 is curved longitudinally and that end portion of the said brace which is connected with the wire 13 is disposed downwardly toward the body portion 1. When the utensil is used the brace 4 is drawn back along the handle 3 whereby the free edge portion of the hinged top member 2 is swung away from the body member 1 and the body member 1 is forced down into the material to be handled. The brace member 4 is then moved longitudinally along the handle 3 in a direction toward the body member 1 and this causes the top member 1 to swing down upon the said material and the material is clutched or grasped between the body member 1 and the hinged top member 2. Thus the material is securely held between the said body member and the top member and the upstanding extremities 9 and 11 of the ends 8 and the wire 10 respectively coöperating in conjunction with the intermediate portion of the wire 13 prevent the said material from slipping from between the body member 1 and the hinged top member 2 as the said material is moved or handled.

From the above description taken in conjunction with the accompanying drawing it will be seen that a utensil of simple and durable structure is provided and that the same may be used to advantage for handling material about a hot fire and the parts coöperate with each other to securely hold the material in position in the utensil during the handling or movement of the material.

Having described the invention what is claimed is:—

A utensil comprising a handle, a frame carried thereby, a curved top member hingedly connected with that edge of the frame which is nearest the handle and a brace member pivotally connected with the top member at a point in the line of curvature thereof, and at the extreme free edge thereof and slidably engaging the handle, that end portion of the brace member which is connected with the top member being curved to substantially conform with the curvature of the free edge portion of the top member.

In testimony whereof I affix my signature in presence of two witnesses.

JOSEPH F. THOMPSON.

Witnesses:
MARY THOMPSON,
GEORGE F. THOMPSON.

Copies of this patent may be obtained for five cents each, by addressing the "Commissioner of Patents, Washington, D. C."